US007448346B1

(12) United States Patent
Stone et al.

(10) Patent No.: US 7,448,346 B1
(45) Date of Patent: Nov. 11, 2008

(54) BIRD FEEDER

(75) Inventors: John Stone, Southboro, MA (US);
Benjamin Beck, Boston, MA (US);
David Harting, Needham, MA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 11/434,353

(22) Filed: May 15, 2006

Related U.S. Application Data

(60) Provisional application No. 60/681,285, filed on May 16, 2005.

(51) Int. Cl.
*A01K 39/01* (2006.01)
(52) U.S. Cl. ..................... 119/52.3; 119/57.9
(58) Field of Classification Search ............. 119/51.01, 119/52.1, 52.2, 52.3, 57.8, 57.9, 428, 429, 119/431; D30/124, 126, 128
See application file for complete search history.

(56) References Cited

U.S. PATENT DOCUMENTS

| 1,344,987 | A | * | 6/1920 | Choiniere | ............ 119/55 |
| 2,773,474 | A | * | 12/1956 | Dodds | ............ 119/55 |
| 2,944,517 | A | * | 7/1960 | Siggins | ............ 119/55 |
| 4,223,637 | A | * | 9/1980 | Keefe | ............ 119/52.2 |
| 5,255,631 | A | * | 10/1993 | Anderson | ............ 119/52.2 |
| 5,947,054 | A | * | 9/1999 | Liethen | ............ 119/57.9 |
| 5,964,183 | A | * | 10/1999 | Czipri | ............ 119/52.3 |
| 6,119,627 | A | * | 9/2000 | Banyas et al. | ............ 119/57.9 |
| 6,415,737 | B2 | * | 7/2002 | Banyas et al. | ............ 119/57.9 |
| 6,622,654 | B2 | * | 9/2003 | Fasino | ............ 119/57.9 |
| 2006/0225658 | A1 | * | 10/2006 | Baynard | ............ 119/57.8 |

OTHER PUBLICATIONS

Definition for the term "lateral" from Dictionary.com (pp. 1-5).*

* cited by examiner

*Primary Examiner*—T. Nguyen
(74) *Attorney, Agent, or Firm*—Jacobson Holman PLLC

(57) ABSTRACT

A bird feeder includes a food container including one or more feeding ports adapted to allow birds access into the food container, and a separate perch located relative to each feeding port to enable a bird perched thereon to access a respective feeding port, wherein each separate perch is adjustable relative to its respective feeding port to attract different sized birds.

20 Claims, 6 Drawing Sheets

BIRD FEEDER

CROSS REFERENCE TO RELATED APPLICATIONS

This application claims priority of Provisional Application No. 60/681,285, entitled "BIRD FEEDER" filed on May 16, 2005, and which is incorporated herein by reference.

FIELD OF THE INVENTION

The present invention generally relates to bird feeders, and in particular to such bird feeders which can be used for different sized birds.

BACKGROUND OF THE INVENTION

Bird feeders are commonly used to attract birds to thereby enjoy some of the beauty and sounds of nature. Birds have a wide variety of species, and so bird feeders have been constructed to attract certain types of birds. For example, liquid feeders have been constructed specifically for humming birds by mimicking the shape of a flower and its access to nectar. It is also known that bird feeders which have smaller openings and perches tend to restrict access to smaller birds because the beaks of larger birds do not fit and the spacing to a perch is too small to accommodate a larger bird. It is also known that the more song-full birds tend to be smaller species. Thus, users typically want to attract smaller and more attractive birds while excluding larger birds such as crows. Thus, the selective attraction of smaller or larger birds, depending upon location and season, is a reasonable consideration in choosing a bird feeder.

SUMMARY OF THE INVENTION

In one embodiment of the present invention, a bird feeder comprises: a food container including one or more feeding ports adapted to allow birds access into the food container; and a separate perch located relative to each feeding port to enable a bird perched thereon to access a respective feeding port, wherein each separate perch is elongated and rotationally mounted at one end to move in a radial direction with respect to a longitudinal axis of the food container to have an adjustable distance from a respective feeding port.

Each elongated perch may be constructed with a varying height in relation to its respective feeding port to accommodate different sized birds relative to its respective feeding port. Each elongated perch may be curved in the radial direction of rotational movement with respect to the food container.

Each separate perch may be rotationally mounted to a rotatable member located within the food container and adapted to extend substantially radially through a separate respective opening in the food container to be located in front of a respective feeding port. The rotatable member may be adapted to be rotated relative to the food container to determine a relative position between each perch and the food container in proximity to a the respective feeding port. A relative position for each perch may determined by a relative rotational position of the rotatable member with respect to the food container and resulting interference between each perch and the food container at the respective opening. The food container may include a bottom member rotationally coupled to the food container and linked to the rotatable member to cause rotation of the rotatable member by rotation of the bottom member.

The food container may have a generally cylindrical shape and the bottom member may be circular. The food container may include a first circular cross-sectional portion having a first plurality of the one or more feeding ports located therein. The food container may include a second circular cross sectional portion being the location of a second plurality of feeding ports, and the bird feeder may further comprise a separate respective perch located relative to each feeding port of the second plurality of feeding ports to enable a bird perched thereon to access a respective feeding port, wherein each separate respective perch is elongated and rotationally mounted at one end to move in a radial direction with respect to the food container to have an adjustable distance from a respective feeding port.

The bird feeder may further comprise a second rotatable member rotationally mounting the separate respective perches located relative to respective feeding ports of the second plurality of feeding ports, wherein the second rotatable member is adapted to be rotated relative to the food container to determine a relative position between each the separate respective perch and the food container in proximity to a the respective feeding port of the second plurality of feeding ports. The second rotatable member may be linked to the first bottom member to enable rotation of the second rotatable member thereby.

The bird feeder may further comprise first and second cylindrical collars respectively located around the first and second circular cross-sectional portions and adapted to allow access to the first and second plurality of feeding ports, respectively, by rotation of the first and second cylindrical collars around the first and second circular cross-sectional portions and relative to the food container. The first and second plurality of feeding ports may each include relatively smaller and larger openings adapted for allowing selective use of smaller and larger sized bird feed, respectively, and the first and second cylindrical collars may allow selective access to the smaller or larger openings by rotation thereof relative to the food container.

BRIEF DESCRIPTION OF THE DRAWINGS

The present invention is illustratively shown and described in reference to the accompanying drawings, in which.

DETAILED DESCRIPTION OF THE DRAWINGS

Figure 1:
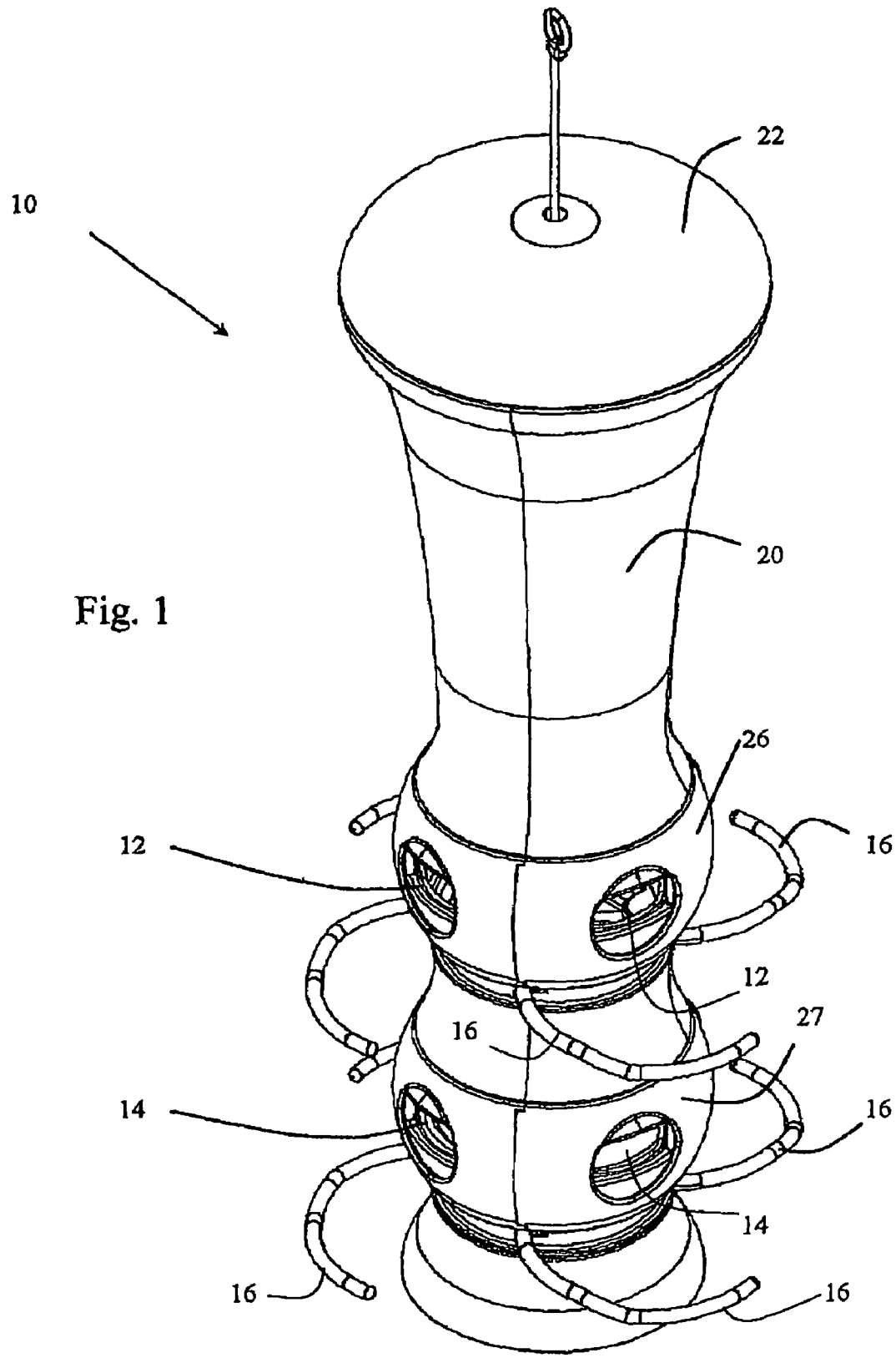
FIG. 1 is a perspective view of a bird feeder constructed in accordance with one embodiment of the present invention.

FIG. 1 shows a perspective view of a bird feeder 10, which is generally cylindrical in shape and includes first and second pluralities of feeding ports 12, 14 along with separate perches 16 located relative to each feeding port 12, 14. Bird feeder 10 is hollow and forms a feed hopper in upper portion 20, which is accessed by a removable top cover 22 adapted to allow bird feeder 10 to be filled. Bird feeder 10 further includes a separate cylindrical collar 26, 27 located around those portions of bird feeder 10 in which feeding ports 12, 14 are located.

Figure 2:
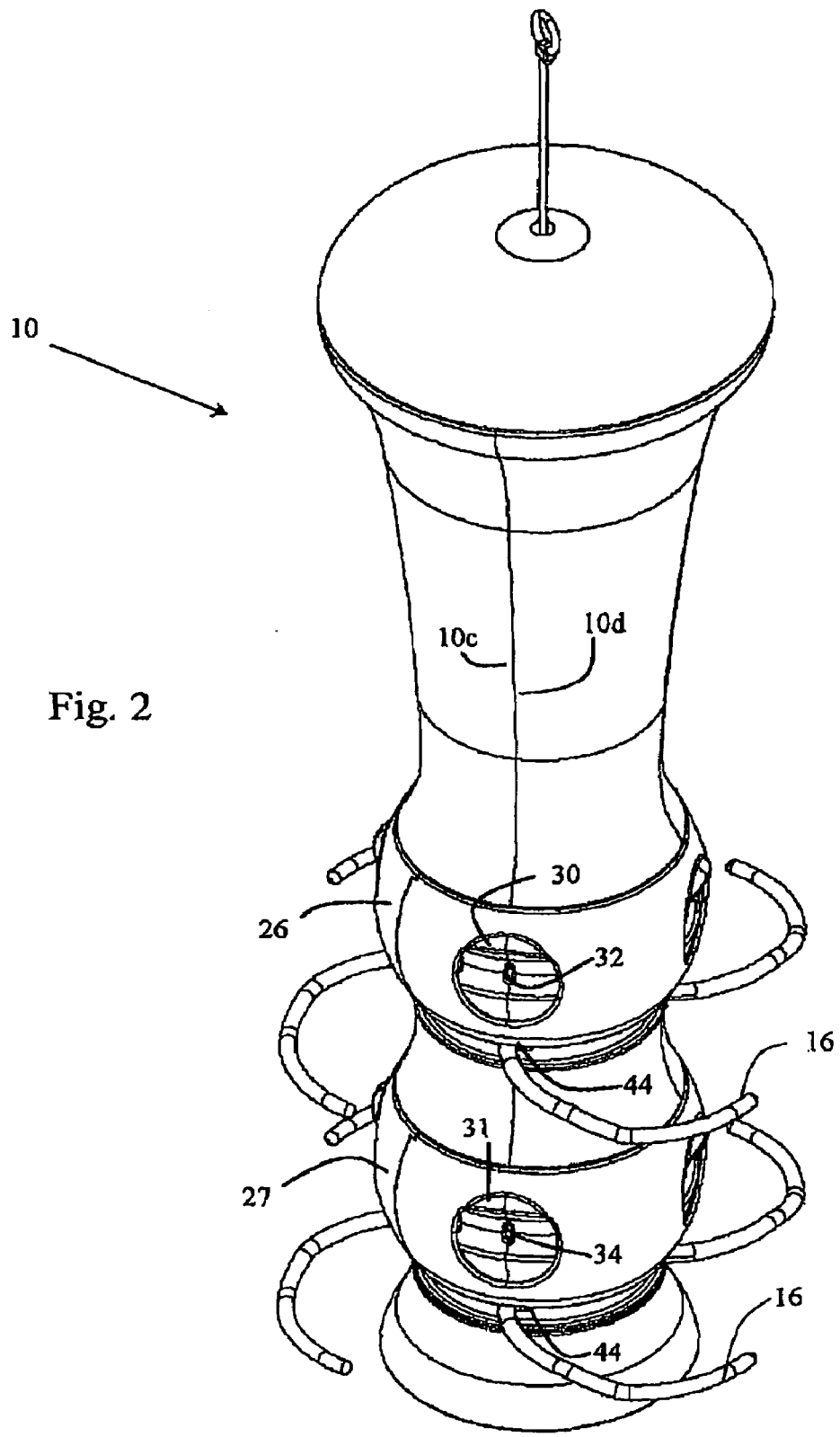
FIG. 2 is the same perspective view of the embodiment of FIG. 1, with operative components of the bird feeder located in an alternate position.

FIG. 2 is another perspective view of bird feeder 10, wherein cylindrical collars 26, 27 are located in a different rotational position relative to bird feeder 10. In this position, openings 30, 31 in respective collars 26, 27 expose another plurality of feeding ports 32, 34, respectively, which are much smaller than the feeding ports 12, 14 of FIG. 1. Selection of smaller feeding ports 32, 34 restricts access into feeder 10 to smaller birds.

Figure 3:
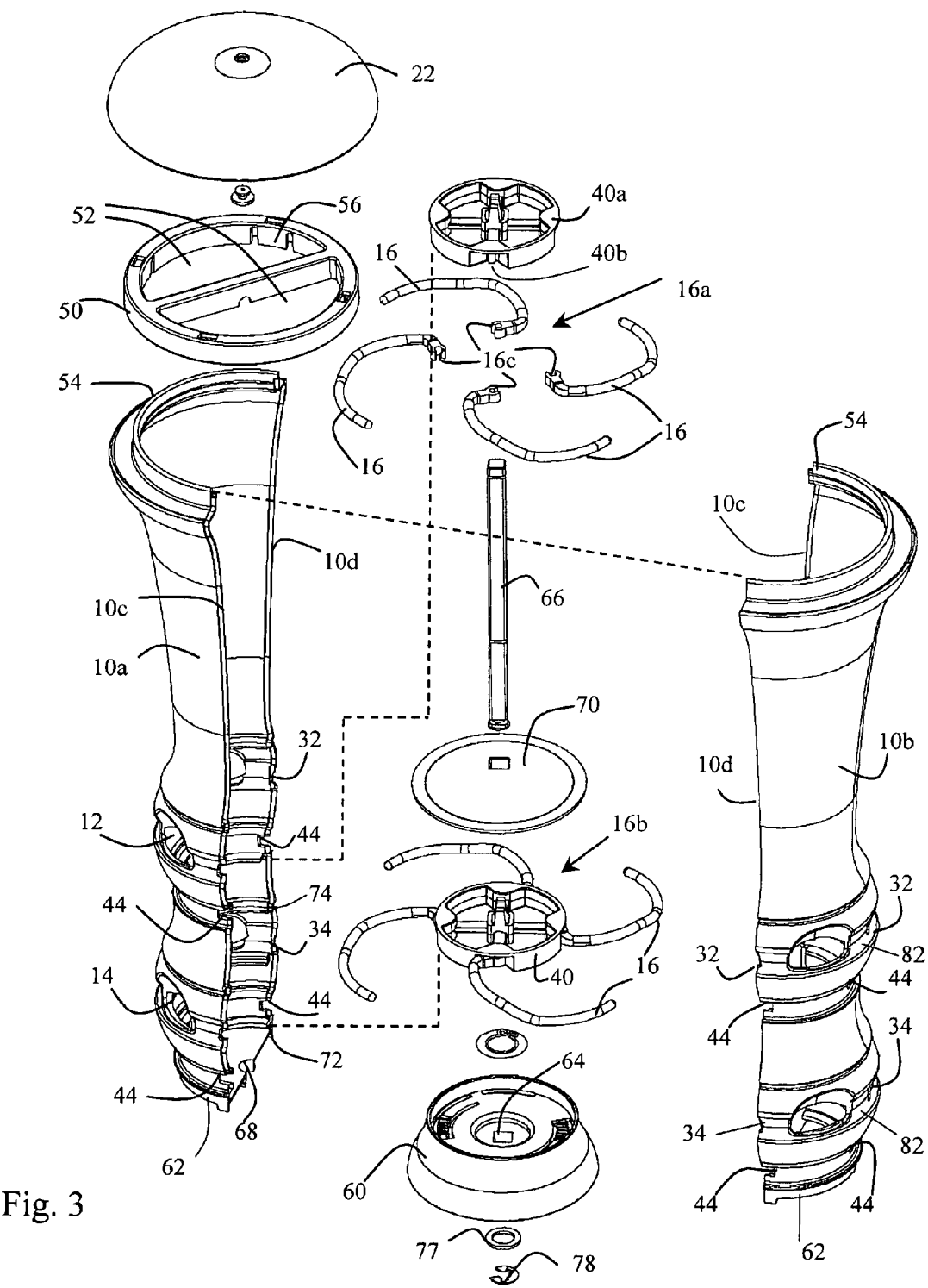
FIG. 3 is an exploded view of the bird feeder of FIGS. 1-2.
Figure 4:
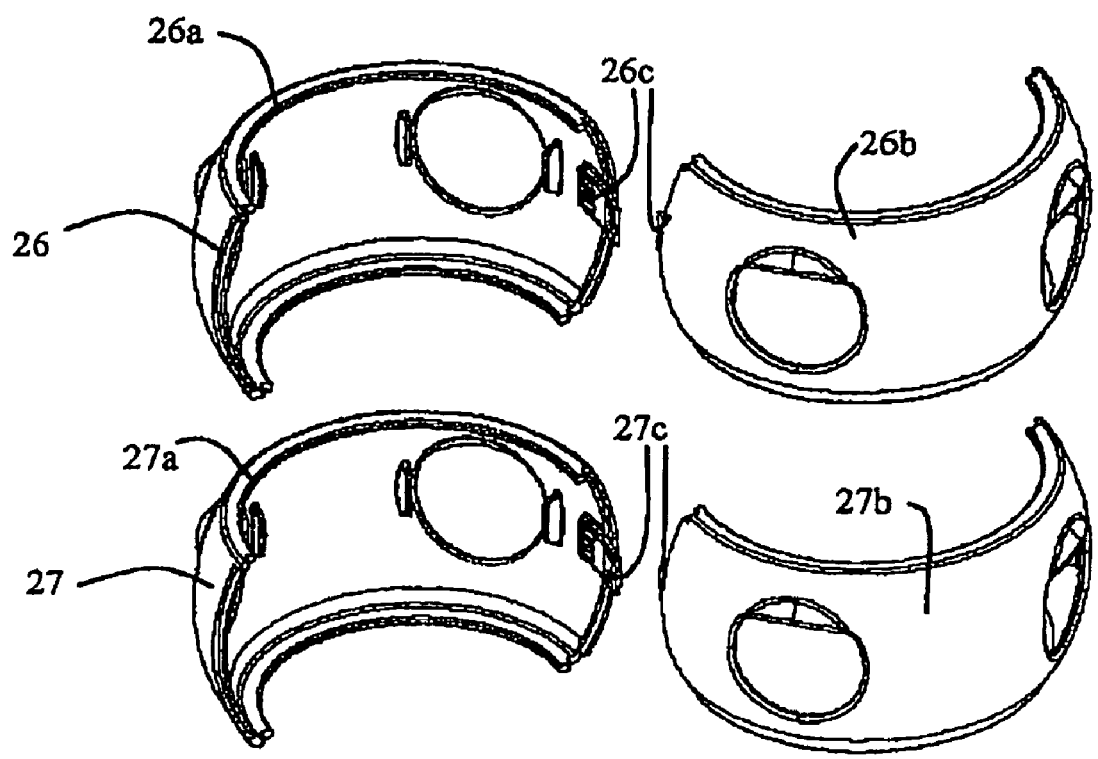
FIG. 4 is an exploded view of several components from the bird feeder of FIGS. 1 and 2.

FIG. 3 is an exploded view of bird feeder 10 of FIGS. 1 and 2, showing additional internal components, but omitting cylindrical collars 26, 27. FIG. 4 is an exploded view of cylindrical collars 26, 27, exclusively. In FIG. 3, bird feeder 10 is shown to include two identical feeder halves 10a, 10b, which are designed to interconnect along the vertical seams 10c, 10d. Feeding ports 12, 14, 32, 34 are also shown. Half of ports 32 are formed along seams 10c, 10d (FIGS. 2, 3), and thus only appear as indentations in FIG. 3.

FIG. 3 also shows a multiplicity of perches 16 located in an unconnected upper group 16a as well as a connected lower group 16b. Perches 16 are elongated and include a c-collar 16c at one end to enable rotational mounting of each perch 16 to a complementary post or axel. In lower group 16b, perches 16 are rotatably connected to a rotational member 40. In upper group 16a, perches 16 are arranged in the relative position they would have when connected to the adjacent rotational member 40a. Rotational member 40a shows an appropriate post or axel 40b for mounting a perch 16. Perches 16 are elongated and are designed to extend radially from their respective rotational members 40, 40a. Perches 16 are intended to pass through a multiplicity of openings 44 located in the feeder halves 10a, 10b. Several ports 44 are located along seams 10c, 10d (FIGS. 2, 3), and thus appear simply as indentations therein.

FIG. 3 further shows a top collar 50 used to secure feeder halves 10a, 10b around their upper edges 54 by means of internal, self locking hooks (not shown) mounted on flexible elements 56. Top collar 50 includes substantial openings 52, which allows bird feeder 10 to be filled with feed. Removable top cover 22 is shown to close the openings 52 in top collar 50.

FIG. 3 still further shows a base 60 adapted to surround the lower ends 62 of feeder halves 10a, 10b. Base 60 is shown to include a square shaped axial opening 64 adapted to receive the lower end of a square shaft 66. Shaft 66 is designed to pass through complementary openings located in rotational members 40, 40a such that rotation of base 60 relative to feeder halves 10a, 10b causes a like rotation of rotational members 40, 40a. Shaft 66 is intended to rotate freely within a circular opening 68 in the base of feeder halves 10a, 10b.

FIG. 3 still further shows a circular disk 70 which prevents the movement of feed below the lower plurality of feeding ports 14, 34. Disk 70 is contoured slightly higher in the middle to cause feed to gravitate towards feeding ports 14, 34.

FIG. 4 shows cylindrical collars 26, 27 exploded into halves 26a, 26b, 27a, 27b, respectively. Each collar half includes an engagement clip 26c, 27c for engaging its respective opposing half.

During the assembly of bird feeder 10, perches 16 are located on respective posts or axles 40b of rotational members 40, 40a. Members 40, 40a are supported within feeder halves 10a, 10b by circular lips 72, 74 respectively, and the elongated perches 16 extend through openings 44. Circular disk 70 rests on top of rotational collar 40, while collar 40a remains open for the passage of feed to lower feeding ports 14. Shaft 66 is passes through collar 40, disk 70 and collar 40a, respectively. Once feeder halves 10a, 10b are closed, top collar 50 is affixed thereto and snaps into place along top edges 54. Base 60 is located around bottom edges 62 with shaft 66 extending through central opening 64. The bottom of shaft 66 is then finished with a washer 77 and a c-clip 78. Cylindrical collars 26, 27 (FIGS. 1, 2 and 4) are then attached to feeder 10 by interconnection of respective halves 26a, 26b, 27a, 27b so that cylindrical collars 26, 27 may be rotated relative to feeder halves 10a, 10b. Feeder halves 10a, 10b are shown to include circumferential indentations 82 to allow clearance for clips 26c, 27c and the rotation of collars 26, 27 relative to feeder 10. The circular cross section of feeder 10, and particularly around feeding ports 12, 14, 32, 34, allows this relative rotation.

Figure 5:
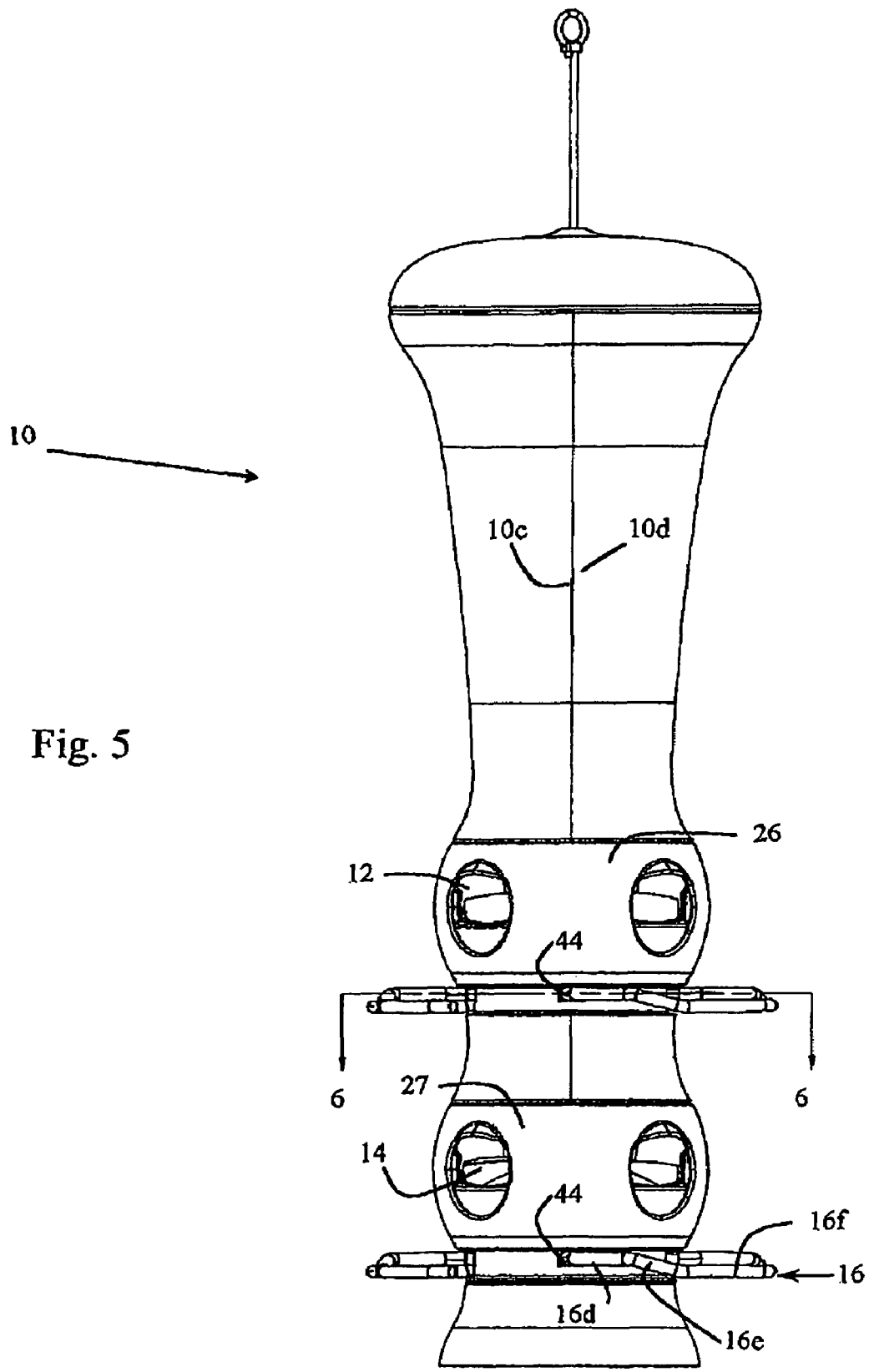
FIG. 5 is a side view of feeder of FIG. 1.

FIG. 5 shows a side view of feeder 10 which provides contour detail of perches 16. Perches 16 are shown to extend through openings 44 in feeder 10 and to be located substantially horizontally with respect to feeding ports 12, 14. Perches 16 are constructed to have a first section 16d, located near feeder 10, which section 16d has the highest height along perches 16. Next, a transitional section 16e lowers the height of perches 16 to a final lower level section 16f. In this manner, perches 16 provide different relative perch heights for the different feeding ports 12, 14, 32, 34. Smaller ports 32, 34 (FIG. 2) are located behind cylindrical collars 26, 27 in FIG. 5 along seams 10c 10d. Openings 44 are similarly located, and thus the highest perch sections 16d are located closest to the smallest feeding ports 32, 34. Likewise the lower perch sections 16f are located closest to the larger feeding ports 12, 14 to accommodate larger birds.

Figure 6:
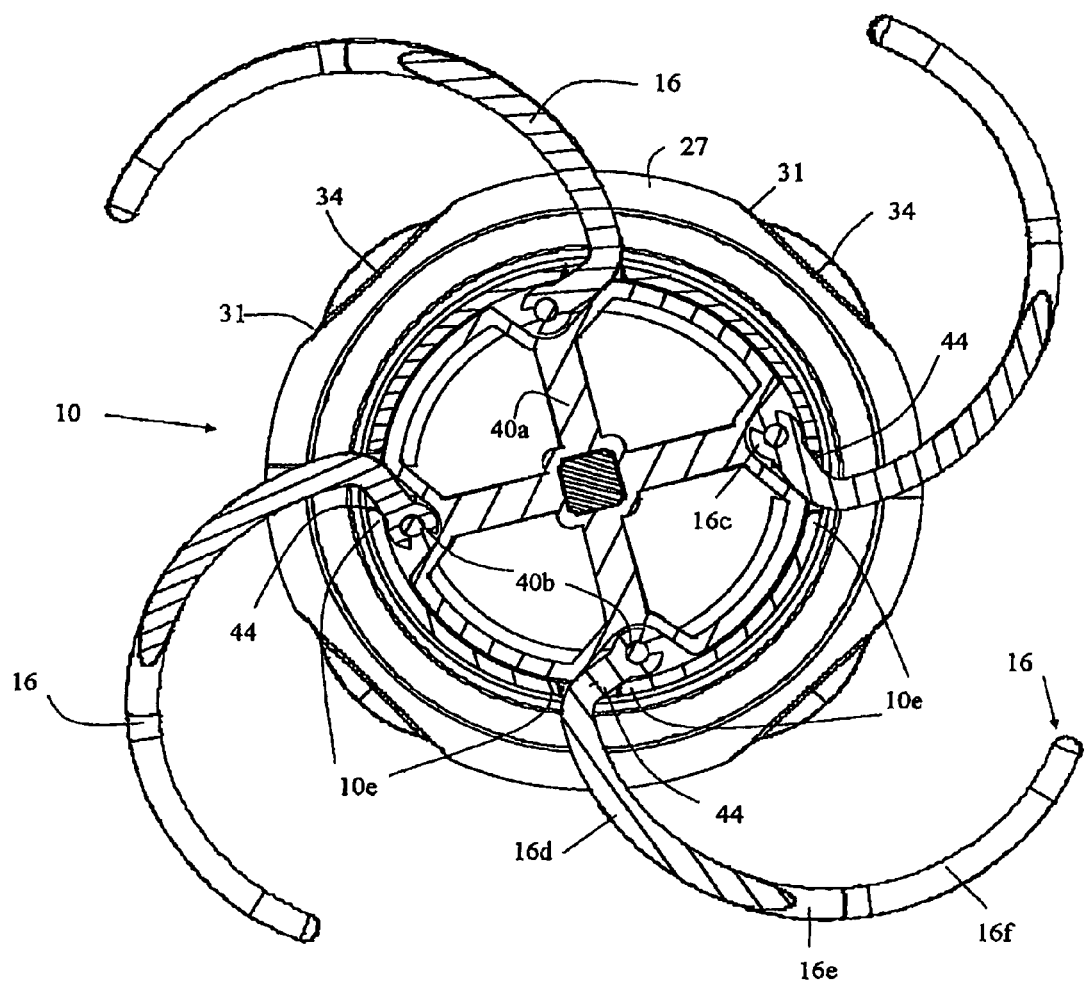
FIG. 6 is a cross sectional view of the bird feeder of FIG. 5 taken along view lines 6-6.

FIG. 6 shows greater detail of the mounting of perches 16 to rotatable member 40a and the available adjustments of perches 16 relative to feeding ports 34. Perches 16 are shown with c-collars 16c engaging cylindrical posts or axles 40b to provide horizontal rotatable mounting thereto. Perches 16 are also shown to extend through openings 44 and to make contact with the sides 110e of feeder 10. Thus, it is through the rotation of rotatable member 40a and contact or interference between perches 16 and the sides of openings 44 that perches 16 rotate and remain within an imaginary horizontal plane and that the position of perches 16 relative to feeder 10 is determined.

FIG. 6 also shows the circular cross section of feeder 10 in the area of feeding ports 34 as well as the even angular location of those ports around the circular cross section. Larger ports 12, 14 are likewise evenly distributed between smaller ports 32, 34 and thus may be simultaneously chosen by the angular position of cylindrical collars 26, 27 and the even spaced openings 30, 31 located therein.

In operation, feeder 10 is first filled with bird feed by removal of top cover 22, and the feed filters down past rotatable member 40a until it reaches feeding ports 14, 34 and is stopped by circular disk 70. Next, cylindrical collars 26, 27 are set to choose either the larger feeding ports 12, 14 or the smaller feeding ports 32, 34. Because of the separate sets of ports and rotatable collars it is possible to choose smaller feeding ports for one level and the larger ports for another level. Lastly, base 60 is rotated relative to feeder 10 to determine the spacing of perches 16 from the separate sets of feeding ports.

The present invention thus provides a highly adjustable bird feeder 10 which may easily be used to selectively attract smaller song birds. Bird feeder 10 may be readily adjusted seasonally, and also in accordance with location and migratory patterns, to attract the most desirable birds.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:
1. A bird feeder, comprising:
 a food container including one or more feeding ports configured to allow birds access into said food container; and
 a separate perch located relative to each feeding port to enable a bird perched thereon to access a respective feeding port, each of the separate perches being elongated and rotationally mounted at one end to move in a radial direction with respect to a longitudinal axis of said food container so as to have an adjustable distance from a respective feeding port.

2. The bird feeder of claim 1, wherein each elongated perch has a varying height in relation to its respective feeding port to accommodate different sized birds relative to its respective feeding port.

3. The bird feeder of claim 1, wherein each elongated perch is curved in said radial direction of rotational movement with respect to said longitudinal axis of said food container.

4. The bird feeder of claim 1, wherein each separate perch is rotationally mounted to a rotatable member located within said food container and configured to extend substantially radially through a separate respective opening in said food container to be located in front of a respective feeding port.

5. The bird feeder of claim 4, wherein said rotatable member is configured to be rotated relative to said food container to determine a relative position between each said perch and said food container in proximity to a said respective feeding port.

6. The bird feeder of claim 5, wherein a relative position for each perch is determined by a relative rotational position of said rotatable member with respect to said food container and resulting interference between each perch and said food container at said respective opening.

7. The bird feeder of claim 6, wherein said food container includes a bottom member rotationally coupled to said food container and linked to said rotatable member to enable rotation of said rotatable member by rotation of said bottom member.

8. The bird feeder of claim 7, wherein said food container has a generally cylindrical shape and wherein said bottom member is circular.

9. The bird feeder of claim 8, wherein said food container includes a first circular cross-sectional portion having a first plurality of said one or more feeding ports located therein.

10. The bird feeder of claim 9, wherein said food container includes a second circular cross sectional portion that has a second plurality of feeding ports, and further comprising a separate respective perch located relative to each feeding port of said second plurality of feeding ports to enable a bird perched thereon to access a respective feeding port, wherein each separate respective perch is elongated and rotationally mounted at one end to move in said radial direction with respect to said longitudinal axis of said food container to have an adjustable distance from a respective feeding port.

11. The bird feeder of claim 10, further comprising a second rotatable member rotationally mounting said separate respective perches located relative to respective feeding ports of said second plurality of feeding ports, wherein said second rotatable member is configured to be rotated relative to said food container to determine a relative position between each said separate respective perch and said food container in proximity to a said respective feeding port of said second plurality of feeding ports.

12. The bird feeder of claim 11, wherein said second rotatable member is linked to said bottom member so as to enable rotation of said second rotatable member.

13. The bird feeder of claim 12, further comprising first and second cylindrical collars respectively located around said first and second circular cross-sectional portions and configured to allow access to said first and second plurality of feeding ports, respectively, by rotation of said first and second cylindrical collars around said first and second circular cross-sectional portions and relative to said food container.

14. The bird feeder of claim 13, wherein said first and second plurality of feeding ports each includes relatively smaller and larger openings configured to allow selective use of smaller and larger sized bird feed, respectively, and wherein said first and second cylindrical collars allow selective access to said smaller or larger openings by rotation thereof relative to said food container.

15. A bird feeder, comprising:
a food container including one or more feeding ports configured to allow birds access into said food container, said food container having a substantially vertical orientation; and
an adjustable perch located relative to each of the feeding ports that enables a bird perched thereon to access a respective feeding port, each of the perches being elongated and rotationally mounted at one end to move in a radial direction with respect to a longitudinal axis of said food container and being curved in said radial direction of rotational movement with respect to said food container so as to be radially positionable relative to the respective feeding port.

16. The bird feeder according to claim 15, wherein each of said perches includes a first perch section adjacent the rotationally mounted end having a first perch height, and a second perch section at an end opposite to the rotationally mounted end having a second perch height that is lower relative to the first perch height.

17. The bird feeder according to claim 15, wherein each of said perches is rotationally mounted to a rotatable member located within said food container, and said rotatable member is configured to rotate relative to said food container to provide the adjustable perch position.

18. A bird feeder, comprising:
a food container including one or more feeding ports configured to allow birds access into said food container, said food container having a generally cylindrical shape and a substantially vertical axial orientation; and
an adjustable perch located relative to each of the feeding ports that enables a bird perched thereon to access a respective feeding port, each of the separate perches being elongated and rotationally mounted at one end to move outward and inward in a radial direction with respect to a longitudinal axis of said food container to provide an adjustable perch distance from a respective feeding port for accommodating different sized birds.

19. The bird feeder according to claim 18, further comprising a first and a second circular cross-sectional portion each having respectively a first and a second plurality of said feeding ports located therein, and a first and a second cylindrical collar respectively located around said first and second circular cross-sectional portions that are configured to allow access to said first and second plurality of feeding ports, respectively, by rotation of said first and second cylindrical collars around said first and second circular cross-sectional portions.

20. The bird feeder according to claim 19, wherein said first and second plurality of feeding ports each includes relatively smaller and larger openings configured to enable selective use of smaller and larger sized bird feed, respectively, and wherein said first and second cylindrical collars enable selective access to said smaller or larger openings by rotation thereof relative to said food container.

* * * * *